（12) United States Patent
Chapuis et al.

(10) Patent No.: US 6,657,872 B2
(45) Date of Patent: Dec. 2, 2003

(54) VOLTAGE CONVERTER

(75) Inventors: Alain Chapuis, Riedikon (CH); Peter Gammenthaler, Hittnau (CH)

(73) Assignee: Power-One AG, Uster (CH)

( * ) Notice: Subject to any disclaimer, the term of this patent is extended or adjusted under 35 U.S.C. 154(b) by 73 days.

(21) Appl. No.: 10/082,625

(22) Filed: Feb. 26, 2002

(65) Prior Publication Data

US 2002/0122321 A1 Sep. 5, 2002

(30) Foreign Application Priority Data

Mar. 1, 2001 (DE) .......................... 101 09 768

(51) Int. Cl.[7] .................. H02M 3/335; H02M 7/217
(52) U.S. Cl. .................. 363/17; 363/21.6; 363/127
(58) Field of Search .................. 363/16, 17, 21.01, 363/21.04, 21.06, 21.14, 56.02, 97, 98, 131, 132

(56) References Cited

U.S. PATENT DOCUMENTS 5,113,334 A * 5/1992 Tuson et al. .................. 363/25
6,064,580 A * 5/2000 Watanabe et al. .............. 363/17
6,130,825 A * 10/2000 Imamura et al. .............. 363/17
6,304,461 B1 * 10/2001 Walker ........................ 363/17
6,583,993 B2 * 6/2003 Hua ........................ 363/21.06

* cited by examiner

Primary Examiner—Matthew V. Nguyen
(74) Attorney, Agent, or Firm—Carter Schnedler

(57) ABSTRACT

The invention concerns a voltage converter of a flux converter type with a self-regulating synchronous rectifier in the secondary circuit related to a transformer (17), with a capacitor device ($C_1$; $C_1$, $C_2$) being provided, for driving an active switching element ($V_1$, $V_2$) of the synchronous rectifier, which is charged by means of an auxiliary winding ($W_1$, $W_2$) of the transformer in the secondary circuit, and its charge is applied to a control terminal of the active switching element by means of a semiconductor element ($D_1$, $D_2$; 30, 32), with the capacitor device being implemented in such a way that the charge allows synchronous switching operation of the active switching element.

17 Claims, 2 Drawing Sheets

VOLTAGE CONVERTER

BACKGROUND OF THE INVENTION

The present invention concerns a voltage converter of the flux converter type. More particularly, it relates to a flux converter type voltage converter having a self-regulating synchronous rectifier in the secondary circuit.

These types of voltage converters have a synchronous rectifier in the secondary circuit which is typically realized with MOSFETs to attain the most favorable possible efficiency. Numerous topologies are known from the prior art, such as single-ended, balanced, half-bridge, push-pull, full-bridge, or phase shift flux converters.

In particular, however, the principal of self-regulation of synchronous rectifiers, namely the usage of voltage traces already present and/or occurring in the converter circuit for switching on and/or off the active switching elements in synchronization with the switches in the primary circuit, can be problematic in principle in many flux converter topologies, particularly those which are not single-ended flux converters: when, in a balanced, half-bridge, full-bridge, or phase shift flux converter, all of the semiconductors are in a switched-off state, the freewheeling current must be conducted at this time in the secondary circuit through the active (rectifier) switching elements, and, if these elements are realized with MOSFETs, an appropriate drive signal must be present. However, this cannot be directly generated from the transformer, for example by means of an auxiliary winding provided for the drive signal, without any further means.

For these reasons, the principle of self-regulation is known in principle, but for this reason and other problems connected with topology, it is disadvantageous precisely in flux converters of the topologies mentioned.

Rather, in these flux converter topologies (balanced, half-bridge, full-bridge, or phase shift flux converters) or other topologies, driving of power semiconductors of a synchronous rectifier in the secondary circuit, as it is described in an analogous way in the German utility model 299 01 322, is achieved by means of external control, as is schematically described in FIG. 6 for the prior art: a PWM control unit 10 hereby controls both an (otherwise known) switching arrangement in the primary circuit itself, and, via a control unit 14 located by a transformer 16 in the secondary circuit, a pair of powered semiconductors 18, 20 acting as a synchronous rectifier, with the converter output voltage signal dropping off over a load resistor $R_L$.

The voltage curves of FIG. 7 illustrate the switching behavior of the rectifier elements 18 and 20 relative to the transformer voltage (first curve), which, conditioned by the control in the primary circuit, oscillates in the way shown around the zero voltage: in contrast, the drive signals for the transistors 18, 20 (second and third curve) have a level greater than zero for activation of the respective semiconductor for the freewheeling current.

In any case, as is already obvious with reference to FIG. 6, this type of external control of the active switching elements of the synchronous rectifier in the secondary circuit is expensive.

OBJECTS OF THE INVENTION

One object of the present invention is therefore to simplify the driving of active switching elements of a synchronous rectifier in a voltage converter of this type having the topologies mentioned, in particular to reduce the expense for circuit technology, with the principle of self-regulation, i.e., regeneration of the control signals from signals already present in the converter circuit, without the necessity for external signal logics being used.

SUMMARY OF THE INVENTION

Thus, in accordance with one form of the invention, a capacitor device is provided which temporarily stores the driving energy (and/or drive voltage) for the active switching elements in its charge in such a way that, particularly at those times in the operating cycle at which no voltage signal is applied to the auxiliary winding according to the invention in the secondary circuit, the driving operation and therefore the regular mode of operation of the synchronous rectifier can be ensured.

In an advantageous way according one form of the invention, usage is thereby made of the circumstance that the signal generated by the auxiliary winding is synchronous with the transformer voltage, so that the switching on and/or off of the active switching elements of the rectifier occurs with high precision and thereby with low loss. The semiconductor element, diode, or transistor used according to the invention for driving the synchronous rectifier (to be precise: the control terminal of an appropriate rectifier switching element), thereby allows, in a way which requires extremely simple circuit technology, signal generation and signal application through the cooperation of auxiliary winding and capacitor.

It is preferred that a capacitance value for the capacitor device be selected which is significantly higher than a driving capacitance (e.g., gate capacitance in the case of a MOSFET) of the control terminal, so that the charging behaviors concerned ensure reliable driving and stable switching. Selecting a capacitance of the capacitor device which is at least five to ten times the driving capacitance for the active circuit element has hereby particularly proven itself.

In principle, the present invention is suitable for any desired topology in the primary and secondary circuits; in the primary circuit, balanced, full-bridge, half-bridge, or phase shift topologies are to be considered particularly preferred, and, in the secondary circuit, a current doubler or the simple middle point configuration with a storage inductor.

In a preferred embodiment of the invention, the secondary circuit is realized with two circuit arms as a bridge rectifier, so that, for each circuit arm, an active switching element is present which is supplied with charge and/or voltage from an associated auxiliary winding of the pair of auxiliary windings. It can hereby be favorable, on one hand, to provide a shared capacitor as a capacitor device for both arms; alternatively, a further preferred embodiment of the invention provides a series circuit made of inductor (i.e., respective auxiliary winding) and capacitor for each arm, with, in this case, the semiconductor element being realized as a transistor (particularly preferred: MOSFET) and its control signal being received from a node between inductor and capacitor of a respective opposing arm.

The advantage relative to an embodiment with diodes as the semiconductor element and/or only one capacitor is that, through this type of circuit, the capacitor is both charged and discharged by the associated auxiliary winding and the control terminals of the active switching elements are actively drawn to a zero level during the switching-off phases provided, so that, in particular during rapid changes in voltage, capacitive effects of the power semiconductor itself cannot lead to unintended switching on.

A further preferred embodiment of the invention is to combine each of the arms with a voltage limiter because the voltage over a capacitor used as a capacitor element in each arm depends on the input voltage of the converter and therefore, for example during large variations in input voltage, a maximum drive voltage can be exceeded at the active switching element. For this purpose, it particularly suggests itself that suitably located and driven MOSFETs be connected upstream on the channel side from the respective control terminals of the active switching elements for voltage limiting.

As a result, through the present invention, a voltage converter with a self-regulated synchronous rectifier arises, having surprisingly simple circuit technology, which is distinguished by very precise switching behavior of the rectifier elements in the secondary circuit and thereby low loss. Simultaneously, the low number of circuit elements used minimizes the expense for production technology, so that the present invention has great advantages, particularly from the viewpoint of production technology.

BRIEF DESCRIPTION OF THE DRAWINGS

Further advantages, features, and characteristics of the invention arise from the following description of preferred exemplary embodiments and with reference to the drawings.

DESCRIPTION OF THE PREFERRED EMBODIMENTS

Figure 1:
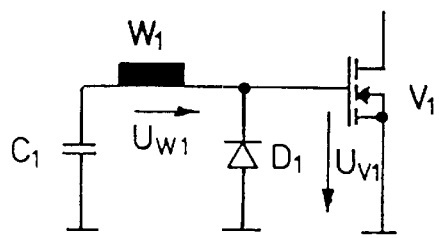
FIG. 1 shows a basic circuit diagram to illustrate the generation of a drive signal for an active rectifier switching element by means of an auxiliary winding and a capacitor.
Figure 2:
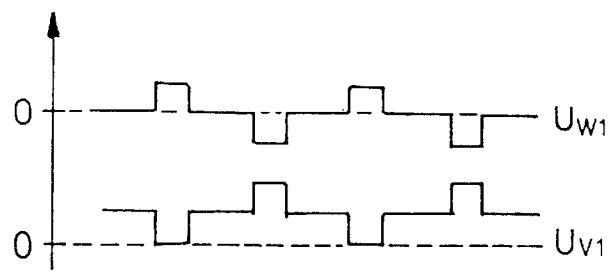
FIG. 2 shows a signal diagram to compare the voltage over the auxiliary winding and the drive voltage.

FIG. 1 and FIG. 2 illustrate how, with the aid of a capacitor $C_1$ as a capacitor device and a diode $D_1$ as a semiconductor element, a transformer voltage signal $U_{W1}$ generated by means of an auxiliary winding $W_1$ in the way of a voltage doubler to generate a drive voltage $U_{V1}$ for the power semiconductor element $V_1$, can be boosted in such a way that the power semiconductor element in rectifier operation can be periodically switched off by a high (i.e., switch-on) level synchronously and in a way which is otherwise known. The signal peaks in the signal $U_{V1}$ generated by the voltage doubling are harmless for operation of the power semiconductor $V_1$. The auxiliary winding is attached, in a way which is otherwise known to the main transformer (not described in more detail) and is closely coupled with its power windings.

Figure 3:
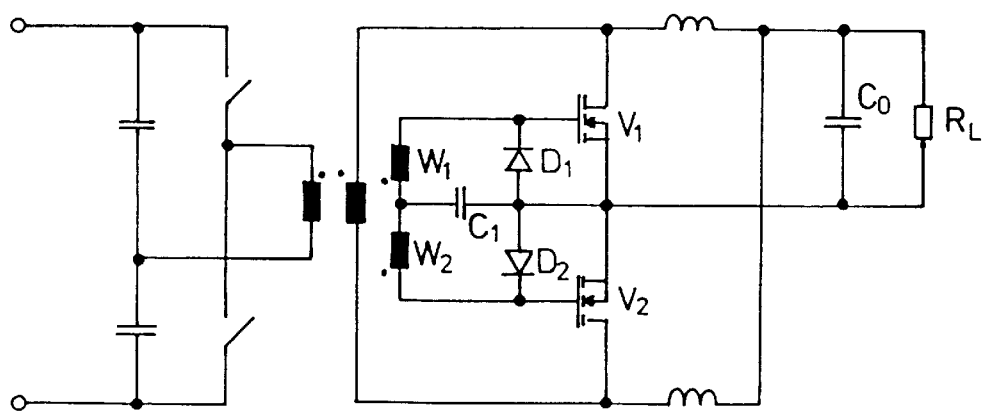
FIG. 3 shows a basic circuit diagram of a first embodiment of the present invention with two active switching elements in the secondary circuit, having an auxiliary winding assigned to each of them and a shared capacitor.

FIG. 3 shows, in a concrete realization using circuit technology, the mode of operation of self-regulation of a synchronous rectifier in the secondary circuit with the aid of a capacitor: a pair of auxiliary windings $W_1$, $W_2$ for the power semiconductor $V_1$ or $V_2$, respectively, generate, in a way which is otherwise known, a voltage signal which is in phase opposition. Due to the action of the assigned diodes $D_1$ and/or $D_2$ and the shared capacitor $C_1$, which is connected between the connection point of the diodes and the auxiliary windings, the drive signal for the power semiconductors $V_1$, $V_2$ are each boosted, in the way shown in the lower curve in FIG. 2, in such a way that a sufficient charge level, and therefore voltage level, is available for the desired driving of the semiconductor. It is hereby assumed that the capacitor $C_1$ is dimensioned so that it is many times larger than a (parasitic) gate capacitor of the MOSFETs $V_1$ and/or $V_2$, so that the voltage dropping off over $C_1$ only sinks insignificantly due to driving of the semiconductor.

Figure 7:
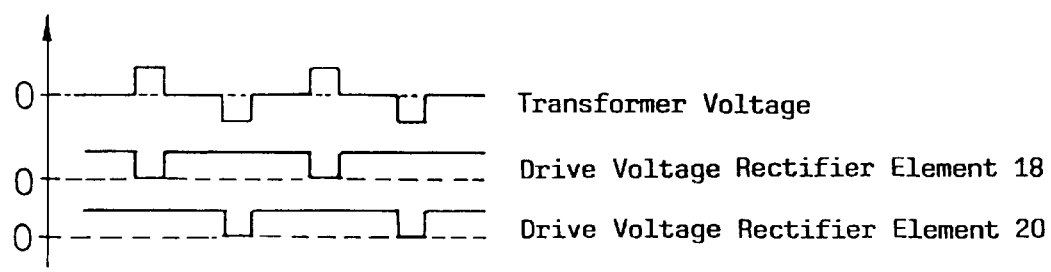
FIG. 7 shows a signal diagram for comparison of the various drive signals generated through an additional switching logic for the active rectifier switching elements in the secondary circuit in FIG. 7.

As a result, a nearly ideal voltage trace for driving the active rectifier arises from this behavior, because the drive voltage, as shown in FIG. 7, is not only constant over the switching on phase, but also, during the phase in which the active rectifier element in phase opposition is switched off, the drive voltage is boosted even more. This is advantageous because, in this phase, the entire load current flows through the one active rectifier element, and its forward resistance (and thereby its power loss) is reduced even further through increased drive voltage.

In addition, the provision of auxiliary windings is not a significant disadvantage in practice, because, in view of the low output voltages to be generated (typically<3.3 V), direct control of the active rectifier elements would not be possible in any case.

While the circuit arrangement of FIG. 3 has a so-called half-bridge configuration in the primary circuit and a so-called current doubler configuration in the secondary circuit, this is merely a suitable exemplary embodiment. In practical realization, however, numerous primary circuit and secondary circuit topologies are suitable, such as balanced, half-bridge, full-bridge, or phase shift configurations in the primary circuit and a current doubler or simple middle point configuration with a storage inductor in the secondary circuit.

A further development of the idea in principle of FIGS. 1 to 3 will be described with reference to FIGS. 4 and 5, with the disadvantages in principle of FIG. 3 able to be improved through the use of (MOSFET) transistors instead of the diodes. The essential disadvantages have already been described above.

It is problematic that the capacitor voltage is a map of the input voltage, and, if this varies, then the capacitor voltage also varies. Because the capacitance value $C_1$ selected must, however, be relatively large, the matching of the capacitor voltage can take quite a long time. In particular, only rapid charging is possible in principle in the diode circuit, and the necessary discharging of the capacitor upon a large (negative) input voltage jump cannot occur through the diodes and must therefore occur via a resistor, which could, however, lead to a permanent power loss. Therefore, the solution with (MOSFET) transistors according to FIG. 4, FIG. 5 is advantageous because the transistors 30, 32 in FIG.

Figure 5:
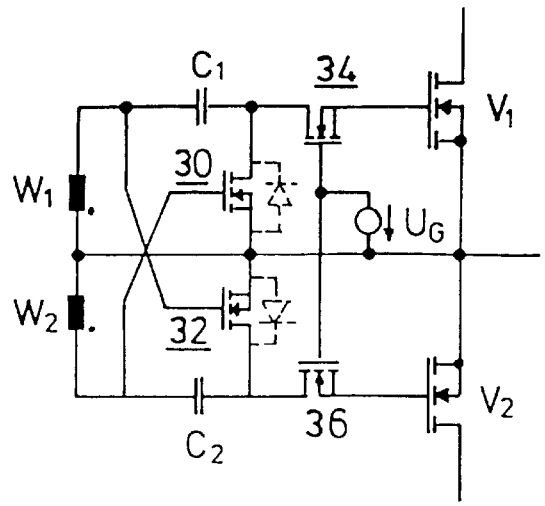
FIG. 5 shows another further development of the circuit diagram according to FIG. 4 with additionally provided transistors wired as a voltage limiter in front of the respective control terminals of the active switching elements (best mode)
Figure 6:
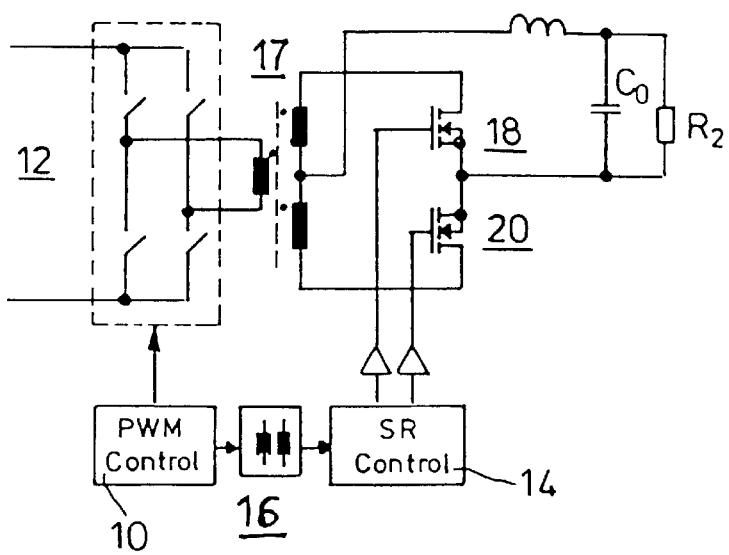
FIG. 6 shows a basic circuit diagram of an externally regulated voltage converter of the flux converter type known from the prior art.

4, FIG. 5 (particularly MOSFETs) can, in principle, be driven in both "current directions" at low resistance, and therefore the capacitor can rapidly charge and also discharge; the voltage on this capacitor thereby always follows the input voltage, independently of how it changes. (If this is not the case, the danger arises that the synchronous rectifier will no longer be properly switched off upon a negative input voltage jump.)

Figure 4:
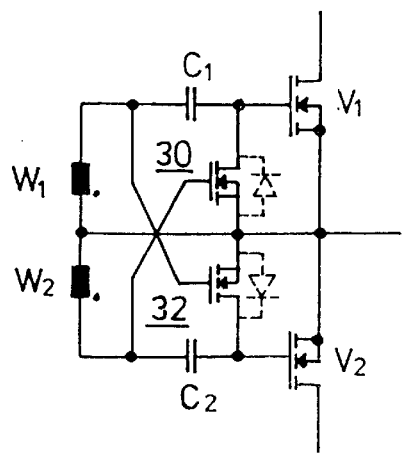
FIG. 4 shows a further development of the principle of FIG. 3 (only a detail of the driving of the power semiconductor) by means of transistors as switching elements and a separate capacitor for each arm.

Thus, in FIG. 4 (and also in the further development of FIG. 5) the sequence of capacitor and inductor (auxiliary winding) is transposed, with the result that each arm of the circuit shown in detail in FIG. 4 has its own capacitor $C_1$ or $C_2$, respectively. In addition, a diode is replaced by a MOSFET 30, 32, respectively, in such a way, that instead of the diode of FIG. 3, the affected channel of the MOSFET runs, and the (gate) driving of relevant MOSFET is picked up, through the signal at the respective opposite arm, i.e., the MOSFET 32 is picked up through the signal at the node between $W_1$ and $C_1$, while the control signal for MOSFET 30 is picked up at the node between $W_2$ and $C_2$.

By this means, it is ensured that a relevant capacitor can now be both charged and discharged by an associated auxiliary winding. In addition, the MOSFET 30 ensures that, in the switched-off state of the power semiconductor $V_1$, its gate electrode is drawn at low resistance to zero potential (and this applies correspondingly for MOSFET 32, and/or $V_2$), with the effect that, in particular during rapid voltage changes at the drain electrode of the active rectifier elements $V_1$, $V_2$, they cannot switch themselves back on through parasitic (feedback) capacitors between drain and gate.

The embodiment shown in FIG. 4 is further supplemented in that another semiconductor 34 and/or 36, preferably a MOSFET, is connected, in the arm between capacitor and the respective control electrode of the power semiconductor element, for voltage limiting, which, as shown symbolically in FIG. 5, is preset with a selected voltage $U_G$ and thereby determines and/or limits a maximum drive voltage for $V_1$ and/or $V_2$.

From the foregoing description of the preferred embodiments of the invention, it will be apparent that many modifications may be made therein. It should be understood, however, that these embodiments of the invention are an exemplification of the invention only and that the invention is not limited thereto. It is to be understood, therefore, that it is intended in the appended claims to cover all modifications as fall within the true spirit and scope of the invention.

What is claimed is:

1. A voltage converter of a flux converter type having a self-regulating synchronous rectifier in the secondary circuit related to a transformer (17), characterized in that a capacitor device ($C_1$; $C_1$, $C_2$) is provided for driving an active switching element ($V_1$, $V_2$) of the synchronous rectifier, which is charged by means of an auxiliary winding ($W_1$, $W_2$) of the transformer in the secondary circuit, and its charge is applied to a control terminal of the active switching element by means of a semiconductor element ($D_1$, $D_2$; 30, 32), with the capacitor device being implemented in such a way that the charge allows synchronous switching operation of the active switching element.

2. A voltage converter according to claim 1, characterized in that a capacitance of the capacitor device is a multiple of an effective capacitance of the control terminal, particularly 5 to 10 times this quantity.

3. A voltage converter according to claim 1, characterized in that the voltage converter has a balanced configuration in the primary circuit and a current doubler configuration in the secondary circuit.

4. A voltage converter according to claim 3, characterized in that the voltage converter has a half-bridge configuration in the primary circuit and a current doubler configuration in the secondary circuit.

5. A voltage converter according to claim 3, characterized in that the voltage converter has a full-bridge configuration in the primary circuit and a current doubler configuration in the secondary circuit.

6. A voltage converter according to claim 3, characterized in that the voltage converter has a phase shift configuration in the primary circuit and a current doubler configuration in the secondary circuit.

7. A voltage converter according to claim 3, characterized in that the voltage converter has a balanced configuration in the primary circuit and a middle point configuration in the secondary circuit.

8. A voltage converter according to claim 3, characterized in that the voltage converter has a half-bridge configuration in the primary circuit and a middle point configuration in the secondary circuit.

9. A voltage converter according to claim 3, characterized in that the voltage converter has a full-bridge configuration in the primary circuit and a middle point configuration in the secondary circuit.

10. A voltage converter according to claim 3, characterized in that the voltage converter has a phase shift configuration in the primary circuit and a middle point configuration in the secondary circuit.

11. A voltage converter according to claim 1, characterized in that, for a pair of active switching elements ($V_1$ $V_2$) of the synchronous rectifier which realizes two rectifier arms, a corresponding pair of auxiliary windings ($W_1$, $W_2$) of the transformer is each provided with an assigned semiconductor element ($D_1$, $D_2$), which are connected with a shared capacitor as a capacitor device ($C_1$).

12. A voltage converter according to claim 1, characterized in that the semiconductor element is implemented as a transistor.

13. A voltage converter according to claim 12, characterized in that the transistor is a MOSFET.

14. A voltage converter according to claim 1, characterized in that, for each of a pair of active switching elements ($V_1$ $V_2$) of the synchronous rectifier realizing two rectifier arms, an associated auxiliary winding ($W_1$, $W_2$) of the transformer and, as a semiconductor element, a transistor (30, 32) are provided, with the capacitor device having a capacitor ($C_1$, $C_2$) connected in series between the control terminal of each relevant switching element of the pair of active switching elements and the associated auxiliary winding, and a control terminal of each of the transistors being connected with one connection node between the auxiliary winding and the capacitor of an opposing rectifier arm.

15. A voltage converter according to claim 14, characterized by apparatus (34, 36) for voltage limiting connected between the capacitor and the control terminal of an associated switching element of the pair of active switching elements.

16. A voltage converter according to claim 15, characterized in that the apparatus for voltage limiting is realized as a channel of a transistor driven with a bias voltage ($U_G$).

17. A voltage converter according to claim 16, characterized in that the transistor is a MOSFET.

* * * * *